3 Sheets—Sheet 1.
E. G. LAMSON.
Stone Channeling Machine
No. 4,189. Reissued Nov. 29, 1870.
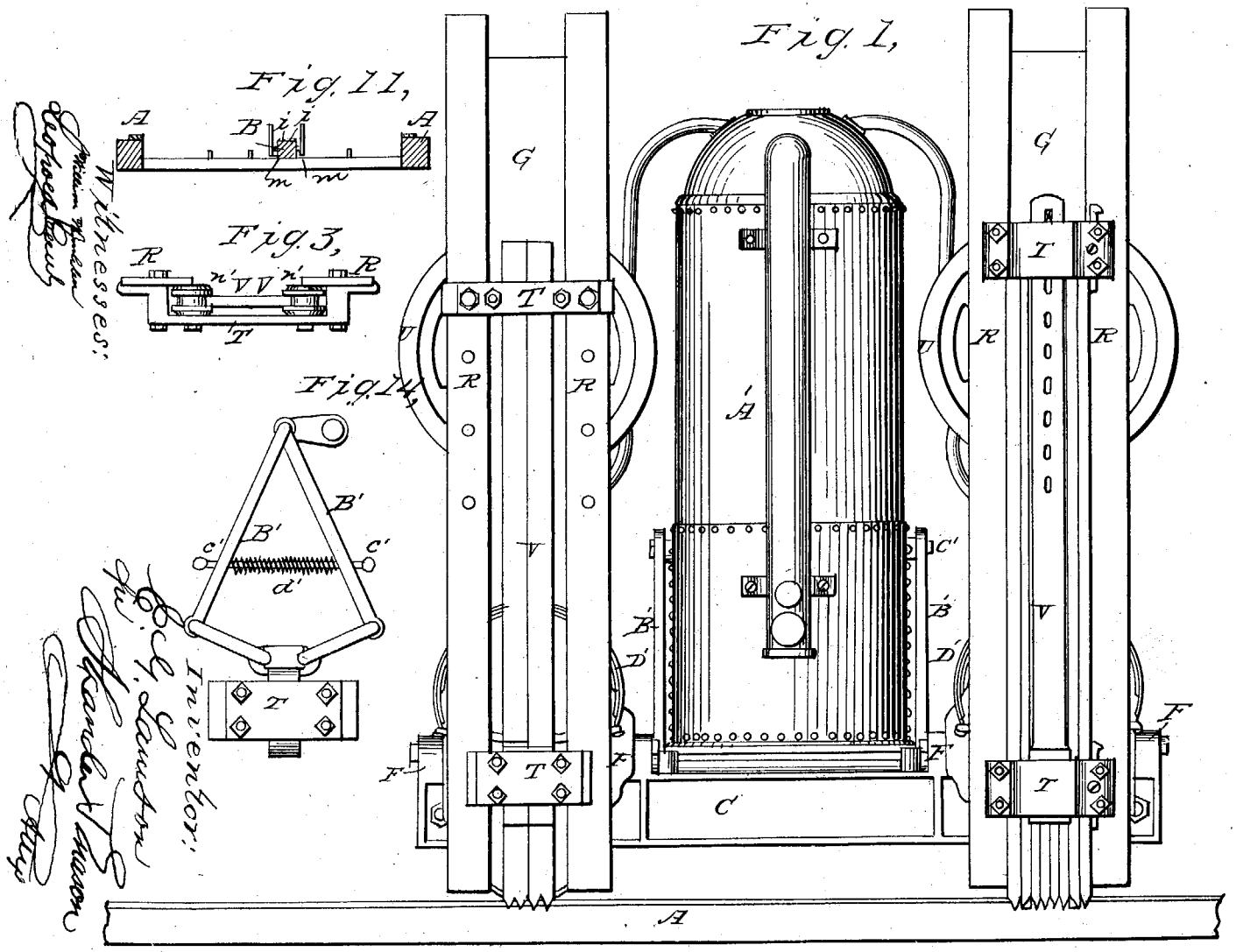
N. PETERS, Photo-Lithographer, Washington, D. C.

3 Sheets—Sheet 2.
E. G. LAMSON.
Stone Channeling Machine.
No. 4,189. Reissued Nov. 29, 1870.
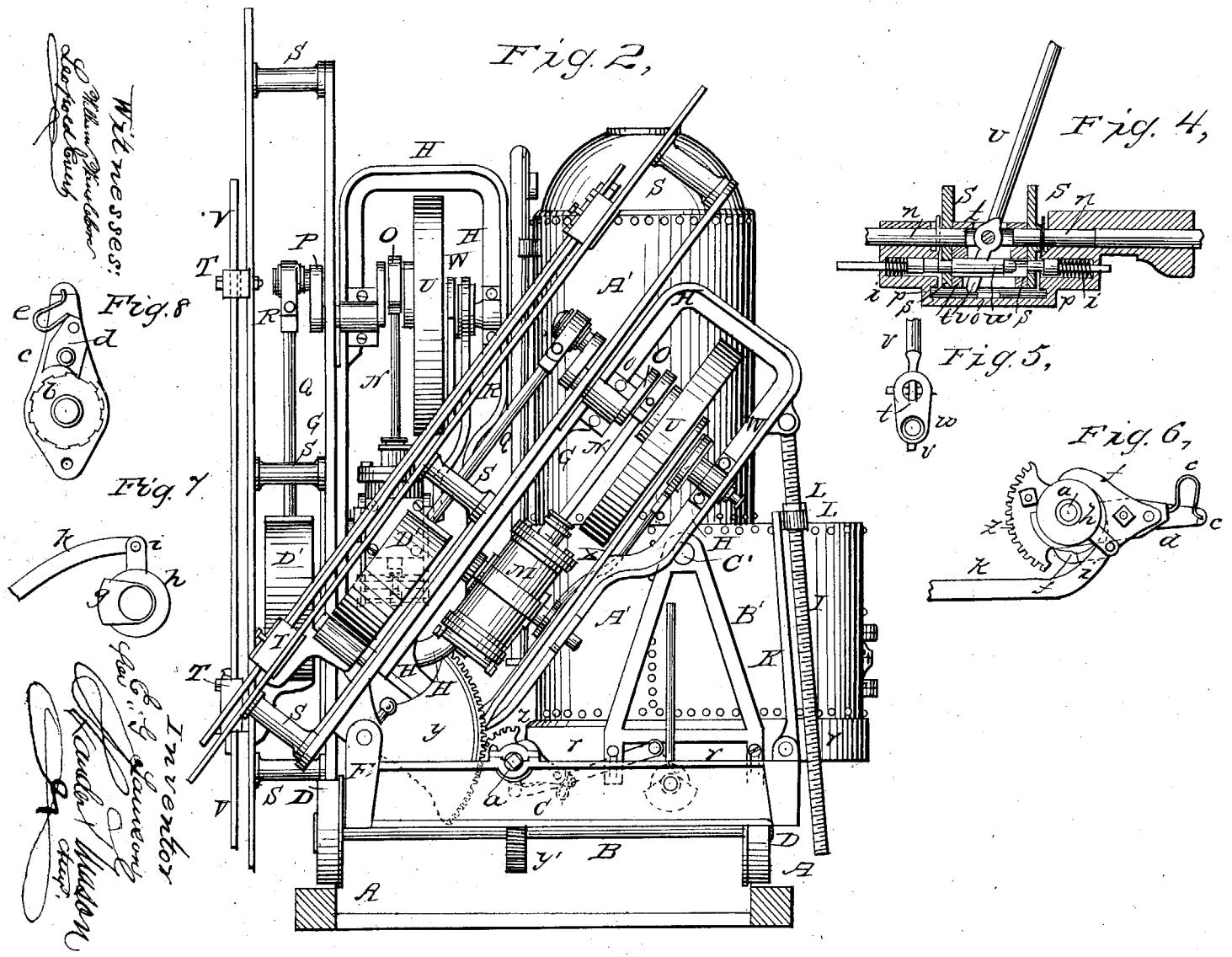
N. PETERS, Photo-Lithographer, Washington, D. C.

3 Sheets—Sheet 3.
E. G. LAMSON.
Stone Channeling Machine.
No. 4,189. Reissued Nov. 29, 1870.
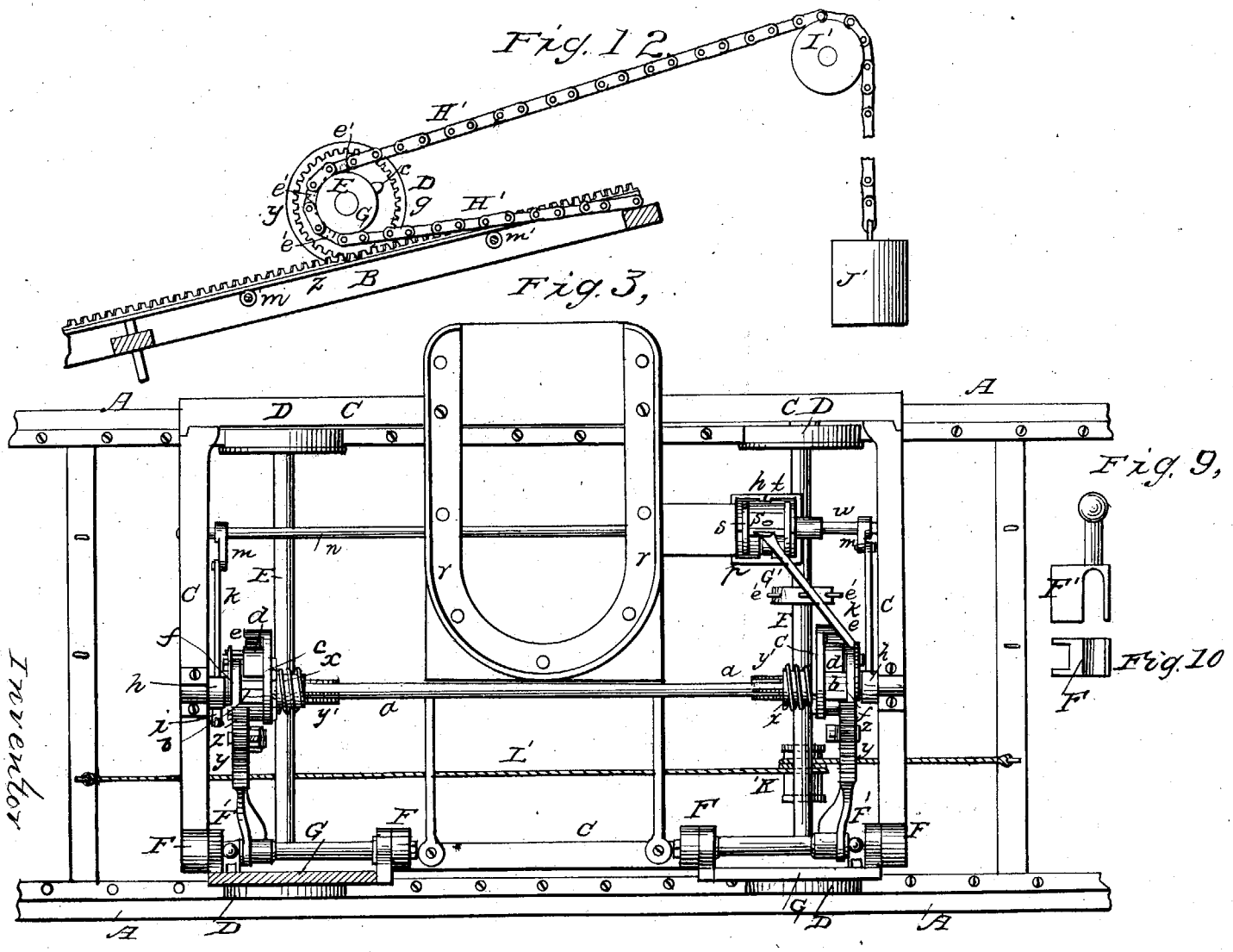
Witnesses:
William Hamilton
Leopold Bauer
Inventor
E. G. Lamson
per
Alexander V. Gleason
Atty
N. PETERS, Photo-Lithographer, Washington, D. C.

United States Patent Office.

EBENEZER G. LAMSON, OF WINDSOR, VERMONT.

Letters Patent No. 89,265, dated April 20, 1869; reissue No. 4,189, dated November 29, 1870.

IMPROVEMENT IN STONE-CHANNELING MACHINES.

The Schedule referred to in these Letters Patent and making part of the same.

*To all whom it may concern:*

Be it known that I, EBENEZER G. LAMSON, of Windsor, in the county of Windsor and State of Vermont, have invented certain new and useful Improvements in Stone-channeling Machines; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention relates to machines for channeling or cutting stone in quarries: and The invention consists—

In the novel construction of the machine, whereby it can be made to stand or move, and operate up and down inclines or laterally along an incline, and can be made to cut a channel or groove at any desired angle, or vertically, as may be desired.

It further consists in mounting the boiler that operates the mechanism on trunnions on the main frame, in such a manner that the boiler will hang vertically, while the frame itself is more or less inclined.

It also further consists in mounting the engine that operates the cutters, and the feed mechanism, in a frame that is capable of being adjusted, with the cutters, at any desired angle; together with certain details, all hereinafter more fully explained.

This machine belongs to that class of stone-cutting or channeling-machines which are used to cut grooves or channels in the bed or strata of rocks as they lie in the quarry, and which are used on a temporary or movable tramway or track.

In constructing my improved machine I first make a bed or main frame, C, as shown in Figure 3, and mount it upon two axles, E, having flanged wheels, D, like those of a car, attached at each end.

Midway of this frame C, at one side, I locate a platform, *r*, to receive and support the boiler A′.

When the machine is to be used on a quarry-bed that is level, or nearly so, the boiler may rest directly upon the platform; but as this machine is more especially intended for use on beds of rock more or less inclined, I provide the boiler with trunnions, C′, on opposite sides, which trunnions rest in standards or supports, B′, secured at opposite sides of the platform *r*, as shown in Figures 1 and 2, these standards being slotted at the points where they are attached to the platform so that they can be raised to support the boiler, or lowered to let it rest on the platform, at will.

Upon that side of the frame C which is opposite to the platform and boiler I mount the cutting and operating mechanism.

To support these I provide a frame or standard, G, which is hinged at its lower end to vertically-projecting ears or lugs, F, secured to or made a part of the frame C, as shown in figs. 1, 2, and 3, the frame G being provided with corresponding ears, which project from its rear face, and through which and the ears F a rod or shaft extends, as represented in fig. 3.

To the front side of this hinged standard or frame G are secured two sets of short posts, S, to the outer ends of each set of which is secured a straight smooth bar, R, the two bars being placed parallel to each other, and a sufficient distance apart to permit the cutters V to play freely up and down between them, as shown in figs. 1 and 2.

The cutters consist of one or more long straight flat bars having their lower ends formed into suitable cutting-points, as shown in fig. 1.

At or near the upper and lower ends of the ways or guide-bars R is inserted a sliding cross-head, T, made of two plates, between which the cutters V are firmly clamped by bolts and wedges, the ends of the cross-head or clamp T being provided with grooves, into which the edges of the guide-bars R fit, the clamp with the drills or cutters thus being guided in their movements in line with the bars R, both clamps T in this case moving with the cutters, as represented in the right-hand part of fig. 1.

In the left-hand part of said figure I have represented a modification of this plan, the same clamp T being used at the lower end to hold and move the drills, while at their upper ends they play loosely between grooved rollers, *n*′, mounted in a cross piece, T, which is secured to the bars R by bolts, there being a series of holes in the bars R for moving the cross piece T as the cutters are lowered in the clamp, the cross piece with its rollers being shown more clearly in Figure 13.

It will be observed that there are two of these hinged frames G, each provided with an independent set of cutters, one mounted near the front end of the frame C and the other near the rear end, as shown in fig. 1.

To operate the cutters and feed the machine along, I mount a small oscillating steam-engine, M, in an open frame, H, which is bolted firmly to the rear side of the hinged standard G, as represented in fig. 2, the cylinder being supplied with steam from the boiler A′ by means of flexible tubes.

In this frame H, above the cylinder, I locate a crank-shaft, O, to which motion is imparted by the piston N of the cylinder, there being a balance-wheel, U, mounted on the same shaft.

The front end of this shaft O projects through the standard G, and has a crank, P, secured thereto; and this crank is connected to the cutters by means of a pitman, Q, and the bow-spring D′, the latter being connected by links to a bracket firmly attached to and projecting from the rear side of the lower clamp or cross-head T, as shown in fig. 2.

This form of bow-spring or yielding mechanism was fully described in a patent heretofore issued to me, and need not therefore be further described herein.

I have, however, invented a substitute for this, which I propose to use in this and other stone-channeling machines, and which is clearly illustrated in Figure 14.

This device consists of two arms, E′, hinged together at or near the point where they are attached to the crank-pin or wrist, at their upper end, these arms being of any suitable length, and held asunder at their lower ends by a spring interposed between them. In the drawing I have represented a spiral spring, *d′*, as being used for this purpose, the spring, in this case, being held in place by a rod, *c′*, which passes loosely through the spring and through a hole in each arm.

Instead of the spiral spring any other kind of spring may be used, the function of the spring being simply to allow the arms E′ to yield when force is applied to them, either in the act of imparting motion to the cutters, or in the effort to withdraw them from the groove in case they stick therein.

The lower ends of these yielding arms E′ are connected by links to the cross-head or clamp T that carries the drills or cutters, the same as the bow-spring D′ is, and as represented in fig. 14.

This device, thus constructed, forms what may be properly termed an elastic or yielding pitman, and is admirably adapted to the purpose for which it is intended.

As a means of adjusting or securing the standard G, with the cutters and the engine that operates them, at any desired angle or position, I connect a screw-rod I by a hinge joint to the rear side of the engine-frame H, and pass this rod through an eye which projects from the side of another rod or bar K, which latter is hinged at its lower end to the frame or bed C on the side opposite to that at which the standard G is hinged, there being two nuts, L, on the rod I, one above and the other below the eye of rod K, by which the two rods are firmly united and held together when adjusted as desired, as represented in fig. 2.

It will be observed that by this arrangement of parts the engine which operates the cutters moves with the cutters whenever the latter are adjusted at different angles or positions, and that thereby the engine, with its shaft O, and the pitman or parts which connect the driving-crank with the cutters, always maintain to each other the same relative position no matter at what angle the cutters may be arranged to cut.

In order to propel the machine in either direction along the track, I have devised a feeding mechanism, as follows:

In the first place, I secure on each axle a worm-wheel, *y′*, and over them, lengthwise of the main frame C, I locate a shaft, *a*, which has secured upon it, at suitable positions to engage with the wheels *y′*, a couple of couple of corresponding screws, *x*, as represented in fig. 3.

Upon this shaft *a* I also secure rigidly a ratchet-wheel, *b*, as shown in detail in Figure 8; and loosely upon the shaft, close alongside of this ratchet *b*, I place a lever or plate, *c*, which has pivoted upon its longer arm a dog or pawl, *d*, which is provided with two points, as shown clearly in Figure 8. This dog *d* is pivoted centrally, in such relation to the ratchet *b* that when swung or inclined to one side one point will engage in the teeth of the ratchet as the lever *c* is moved in one direction, and slip over or past them when moved in the opposite direction, and thus, by the oscillation of the lever *c*, rotate the shaft *a*. When the dog *d* is thrown over to the opposite side, then the opposite point will engage with the teeth of the ratchet *b* on the other side, and thus, as the lever *b* is oscillated, will cause the shaft *a* to rotate in the opposite direction; and when the dog *d* is so turned as to stand in line with the center or longitudinal axis of the lever *c*, then both points of the dog will be clear of the ratchet-wheel *b*, and will thus permit the lever to be oscillated without operating the shaft *a* at all, as is necessary when it is desired to operate the cutters with the machine stationary, as is sometimes the case.

As shown in figs. 6 and 8, there is a spring, *e*, connected to the lever *c*, which also bears upon the end of the dog *d* in such a manner that it tends to hold the dog *d* in either of the positions mentioned.

To operate the lever *c* with its dog *d*, I secure to the shaft *a*, at the opposite side of the ratchet-wheel *b*, an arm or lever, Z, one end of which is segmental in form, and is provided on its periphery with a series of cogs, as shown in fig. 6, motion being imparted to this segmental arm by a similar but larger segment, *y*, which is pivoted or journaled on the shaft that serves to connect the standard G to the ears F of the main frame; this latter segment having a reciprocating or oscillating movement imparted to it by a pitman-rod, X, which latter is worked by an eccentric, W, on the engine-shaft O, as shown in fig. 2.

As a means of enabling the attendant to reverse the feed or stop it entirely, by changing the position of the dog or pawl *d*, as hereinbefore described, I pivot on the inner or short arm of the segment *z* a bifurcated lever, *f*, as shown in Figures 2 and 6, the rear end of which is connected rigidly by a bolt to the rear end of dog *d*, so that as this lever *f* is moved the dog *d* is moved with it.

It will be observed that the arms or prongs of this lever stand on opposite sides of the shaft *a* and at some distance therefrom, and between them, mounted loosely on the shaft *a*, I place a collar, *h*, (see Figure 7,) this collar having a projection, *g*, extending beyond its periphery, and also an arm, *i*, to which latter is connected a rod, *k*, by which the collar *h* is turned partially around on the shaft, as hereinafter explained.

This collar *h* is so located on the shaft that the projection *g* will lie in the same vertical plane as the arms of the lever *f*, so that when the collar is turned in one direction, a certain distance, the projection *g* will strike against one of the arms or prongs of lever *f*, thus throwing it and the dog *d*, which, as before stated, is rigidly attached to lever *f*, over to one side, and, of course, when turned an equal distance in the opposite direction, throwing them to the opposite side.

When the collar *h* is turned midway between these extreme positions the projection *g* will not touch either arm of the lever *f*; and then it, with the dog *d*, will be thrown out of action entirely.

To operate the collar *h*, and thereby the lever *f* and dog *d*, the rod *k* is connected at its opposite end to a crank, *m*, attached to rock-shaft *w*, journaled to the bed-frame C near one side, as shown in fig. 3, there being a similar shaft, *w*, extending to the opposite end of the frame, and there connected in a similar manner to a duplicate feeding mechanism at that end of the machine.

The inner or adjoining ends of these rock-shafts *w* have their bearings in a segmental-shaped box, *p*, which is bolted to the main frame C near one corner, as shown in fig. 3.

The ends of these shafts *w* protrude through into the interior of this box *p* far enough to permit a disk, *s*, to be secured firmly thereon, and also to afford bearings for an oscillating block, *t*, as shown in section, in Figure 4 the block *t* being shown detached, in Figure 5 in end elevation.

This block *t* is slotted vertically and longitudinally, and has pivoted in it a lever, *v*, which is arranged to move in line with the shafts *w*.

In the lower portion of the block *t* I locate a sliding rod, *w'*, through a mortise in which the lower end of the lever *v* protrudes, as represented in fig. 4.

This rod *w'* has its ends made to fit in holes in the disks *s*, which are secured to the ends of the shafts *w*, the rod *w'* being of such a length that when the lever *v* is arranged vertically the rod *w'* will rest entirely within the block *t*; but when the lever is moved to one side, as represented in fig. 4, then the rod will be endwise for enough to cause its end to protrude from the block *t* and enter the hole in the disk *s*, at the same time and by the same operation pushing back and disengaging from the disk *s* a spring bolt or catch, *a'*, which works loosely in a cavity, *z'*, made for it in the box *p* opposite the hole in the disk *s*.

When the lever *v* is thus tilted to one side, and the catch-bolt *a'* is disengaged from the disk *s*, and the bolt *w'* is engaged therewith instead, then, by turning the lever in a line at right angles to its former movement, the block *t* will be turned on its bearings, and will carry with it the disk *s* to which it is locked by the bolt *w'*, and consequently the shaft *w*, to which the disk is secured.

By tilting the lever *v* to the opposite side, the disk *s*, that has just been moved, will be locked in position by its catch-bolt *a'*, and the other disk will be unlocked, when it may be moved with its shaft *w* in the like manner, and thus either of the shafts *w* may be operated at will independently from the other, and each may be moved in both directions, thereby throwing the collar *h*, and by means of it and the lever *f*, the dog *d* to one or the other side at will, at either end of the machine.

Crosswise of the box *p*, along its center, is a raised projection or rib, *o*, as shown in fig. 3, this rib being divided by a lateral groove or passage at its center, at the bottom of the box.

When the lever *v* is turned to a vertical position, its lower end, which protrudes through the block *t*, rests in this groove or passage at the center of the rib *o*, in which case the lever *v* and block *t* are disconnected entirely from the feed mechanism; but when the lever is inclined in the direction of the line of the shafts *w* far enongh to throw its lower end to one side of the rib *o*, then the sliding bolt *w'* is shoved endwise, and made to engage with one of the disks *s* on the end of one of the rock-shafts *w*, and then by turning the lever *v* at right angles to its previous movement or in line with the rib *o*, the rock-shaft *w* will be turned with it, and thus the dog *d* made to engage with the pawl *b*, and thus cause the machine to be fed along in one direction.

By reversing the lever the dog *d* will also be reversed, and the machine then fed in the opposite direction.

By changing the lever to the opposite side of the rib *o* by passing its lower end through the recess at its center, as before stated, the sliding bolt *w'* will be disengaged from the disk *s* on the one side and thrown into connection with that on the opposite side, thus operating the dog *d* at the opposite end of the machine.

By this means it will be seen that the operator, by simply adjusting the lever *v*, can cause the feed mechanism at either end of the machine to feed the machine either forward or backward, as may be desired, and thus either engine alone is made to operate its gang of cutters and move the machine in either direction, while the other engine and its gang of cutters may remain stationary or inoperative, the steam of course being shut off from the latter engine.

Thus far the description contemplates using the machine on a surface where the grade is such that the traction of the wheels D will be sufficient to propel the machine; but it is sometimes desirable to use these machines on steeper grades, where the surface or bed of the rock to be operated upon is more inclined, and where the strata and seams lie in such positions that it is necessary to work the machine up and down these grades or inclines.

To accomplish this, and, at the same time, permit a lighter machine to be used, the traction of which will of course be lessened in proportion to its decrease of weight, I have devised an additional means of propelling the machine.

This plan or method is illustrated in fig. 3; and it consists of a drum, K', secured firmly upon either of the axles, with a cord or chain wound once or more around the same, and having its ends secured to the track or to the rock or other objects some distance in front and rear of the machine.

When thus arranged it is obvious that motion imparted to the drum K' by the feed mechanism or by any other suitable means, will cause the machine to move either forward or backward, according as the drum K' is turned in one or the other direction.

Another method is shown in Figure 12, in which the track is shown in an inclined position.

In this case I provide the track with a central bar, B, upon which is secured a rack, which is placed at such a height that the lower side of the worm-wheel *y'* on the axle E will engage with and gear into the same, thus propelling the machine up the inclines.

In order to assist in operating the machine up and down inclines I also secure upon the axle E a sprocket-wheel, G', as shown in figs. 3 and 12, and then pass around this wheel a chain, H', one end of said chain being secured to the track or to some stationary object in front of the machine, while the other extends some distance in advance of the machine and passes over a pulley, I', and has a weight, J', attached to it, as shown.

The weight will tend to counterbalance the weight of the machine, and to that extent will lessen the power required to propel it.

Where the quarry is of such a size or condition as to admit of it, two tracks may be placed parallel to each other, and by means of a chain passing around a pulley or wheel secured to the bed rock above the machines, the latter may be connected together and thus made to balance each other.

Along the entire length of the rack-bar B, on both sides, extends a projecting flange, *i*, under which engages rollers *m' m'*, which latter are journaled on arms that project downward from the machine, as represented in Figures 11 and 12; these rollers, in conjunction with the flanges *i*, thus serving to hold the machine firmly in place on the track, and prevent it from slipping sidewise or becoming displaced.

The segments *y* are journaled loosely on the rods that hinge the standards to the frame C, and can be moved or shoved sidewise far enough to disconnect them entirely from the segments *z*, and thus throw them out of gear whenever desired.

To keep them to their position when in gear, I provide a bifurcated block or clutch, F', as shown in Figures 9 and 10, and slip it upon the shaft in the corner of the frame between the ear of the standard G and the side of segment *y*, thus holding the latter from moving sidewise until the block F' is removed.

By this means either engine and cutting apparatus may be disconnected from the feed mechanism and remain stationary, while the other engine is operated and made to operate the feed mechanism.

The guide-rollers represented in fig. 13 may be made adjustable on the cross-head T, or they may be replaced by others of a larger or smaller diameter, to adapt the machine to the use of drills or cutters of different sizes and width.

Having thus described my invention,

What I claim, and desire to secure by Letters Patent, is—

1. The segment *y*, pivoted concentrically with the frame that supports the cutters and engine, arranged to be operated by the engine, and to impart motion to the feed mechanism, whereby the cutters may be adjusted at various angles without disconnecting or interfering with the operation of the feed mechanism, substantially as described.

2. The arrangement of the chain H and a weight, J′, in the manner shown, for counterbalancing the weight of the machine when working up or down an incline, as set forth.

3. A stone-channeling machine, having its boiler supported on trunnions arranged lengthwise of the truck, so that the boiler will maintain its vertical position while the machine is working along the face of an incline, as herein described.

4. The adjustable supports B′, in combination with the boiler and the main frame, whereby the boiler can be held suspended or permitted to rest stationary on the truck, substantially as described.

5. A stone-channeling machine, provided with two or more sets of cutters and engines for operating the same independently, in combination with the herein-described feed-mechanism, whereby either engine may be made to feed the machine in either direction, substantially as set forth.

6. The arrangement of the shaft *a* with its screw *x*, and the axle E with its worm-wheel *y′* and the rack-bar B, whereby the worm-wheel *y′* is made to feed the machine along by engaging with the rack-bar, substantially as set forth.

7. The yielding pitman or device, consisting of the hinged arms E′ and a spring arranged to hold said arms asunder, and having links or their equivalents for attaching them to the clamp or cutters, substantially as described.

Witnesses: E. G. LAMSON.

H. WARDNER,

E. E. LAMSON.